United States Patent [19]

Gellert

[11] Patent Number: 4,795,337

[45] Date of Patent: Jan. 3, 1989

[54] COATED INJECTION MOLDING NOZZLE

[76] Inventor: Jobst U. Gellert, 7A Prince Street, Georgetown, Ontario, Canada, L7G 2X1

[21] Appl. No.: 150,747

[22] Filed: Feb. 1, 1988

Related U.S. Application Data

[62] Division of Ser. No. 86,621, Aug. 18, 1987.

[30] Foreign Application Priority Data

Jul. 15, 1987 [CA] Canada .................................. 542185

[51] Int. Cl.⁴ ............................................... A23P 1/00
[52] U.S. Cl. ...................................... 425/549; 219/421
[58] Field of Search ................ 425/549; 219/421, 426, 219/552, 553

[56] References Cited

U.S. PATENT DOCUMENTS

| | | | |
|---|---|---|---|
| 4,238,671 | 12/1980 | Gellert | 219/421 |
| 4,344,750 | 8/1982 | Gellert | 425/548 |
| 4,355,460 | 10/1982 | Gellert | 29/611 |
| 4,386,262 | 5/1983 | Gellert | 219/424 |
| 4,403,405 | 9/1983 | Gellert | 29/611 |
| 4,446,360 | 5/1984 | Gellert | 219/421 |
| 4,557,685 | 12/1985 | Gellert | 425/549 |
| 4,583,284 | 4/1986 | Gellert | 29/611 |

*Primary Examiner*—Bernard Nozick
*Attorney, Agent, or Firm*—Riches, McKenzie & Herbert

[57] ABSTRACT

This invention relates to an improved injection molding nozzle and method of making it. The components are assembled and dipped in lacquer and powdered nickel prior to brazing in a vacuum furnace. This integrally brazes the components together, embeds an electrical heating element in a spiral channel, and provides the surfaces with a protective nickel coating. In one embodiment, the forward end has an integral high speed steel insert and the remote end of the heating element extends into the forward end of the nozzle. In addition to providing the protective coating, carrying out the method with a single vacuum brazing step considerably reduces manufacturing costs.

6 Claims, 6 Drawing Sheets

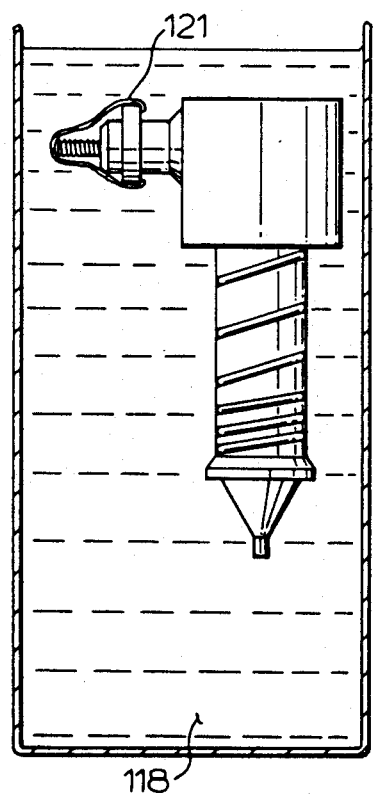
FIG.6.
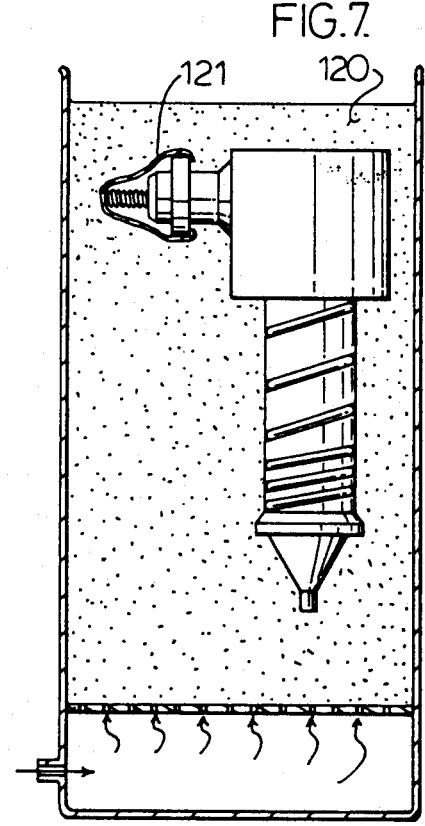
FIG.7.
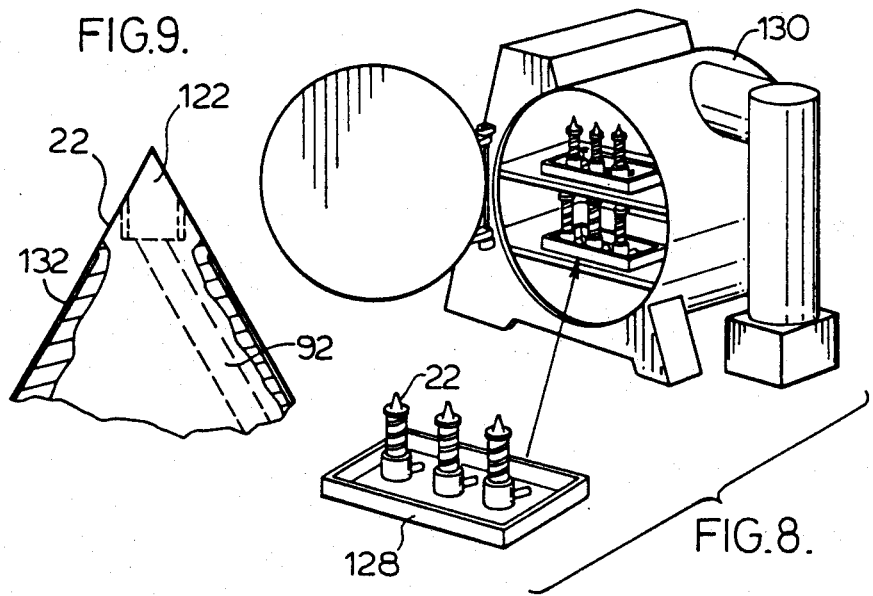
FIG.9.
FIG.8.

COATED INJECTION MOLDING NOZZLE

This is a divisional of application Ser. No. 086,621 filed Aug. 18, 1987.

BACKGROUND OF THE INVENTION

This invention relates to an improved injection molding nozzle and a method of making it in which the components are integrally brazed together with an electrical heating element in a spiral channel around the outer surface and provided with a protective nickel coating.

Casting helical heating elements in an injection molding nozzle is well known in the art. For instance, the applicant's U.S. Pat. No. 4,238,671 entitled "Sprue Bushing with Cast in Heater Element" which issued Dec. 9, 1980 shows a helical heating element cast around a high strength corrosion resistant inner core portion through which the melt passage extends. An improvement in this early method is shown in the applicant's U.S. Pat. Nos. 4,355,460 entitled "Sprue Bushing and Method of Manufacture" which issued Oct. 26, 1982 and 4,386,262 (divisional) entitled "Sprue Bushing with Cast in Electrical Heating Element" which issued May 31, 1983. In these patents, the helical heating element is vacuum case in a copper portion between the inner core portion and an outer sleeve. Further improvements are shown in the applicant's U.S. Pat. Nos. 4,403,405 entitled "Sprue Bushing Connector Assembly Method" which issued Sept. 13, 1983 and 4,446,360 (divisional) entitled "Sprue Bushing Connector Assembly" which issued May 1, 1984 which specifically relate to sealing around the heating element cold terminal using a split washer arrangement. While the nozzles disclosed in all of the above patents ave the advantage that the heating element is cast in copper which rapidly disperses the heat, they have been found to have several disadvantages for certain applications. Firstly, with the increasing demand for high temperature and high pressure applications, it is not possible to provide the required bursting strength without increasing the outside diameter of the nozzles, which is not acceptable for some cavity configurations. Bursting strength minimum requirements of 50,000 psi. are now quite common and this is difficult because the copper portion around the heating element is relatively weak and does not add much strength. Secondly, it is desirable that the coils of the heating element be accurately located in the nozzle. Furthermore, because there is usually more heat loss at the ends of the nozzle than in the middle, it is desirable that the pitch of the heating element vary along the length of the nozzle according to a predetermined pattern, depending upon the application. This has not been found to be possible with these previous nozzles where the central core is inserted into the helical heating element which is then cast in copper.

More recently, in order to overcome some of these and other problems, the applicant has provided a nozzle with a heating element brazed in a spiral channel in the outer surface of the nozzle body. This is shown in the applicant's U.S. Pat. Nos. 4,557,685 entitled "Heated Nozzle for Injection Molding Apparatus" which issued Dec. 10, 1985 and 4,583,284 (divisional) entitled "Method of Manufacture of Injection Molding Heated Nozzle with Brazed in Heating Element" which issued Apr. 22, 1986. However, unfortunately this has been found not be entirely satisfactory because the nickel brazing compound does not flow evenly throughout the spiral channel and thus the contact between the heating element and the body is not uniform throughout its length. Furthermore, this method has the disadvantage that a protective coating is not provided over the entire surface of the nozzle. Also, separate brazing steps are required in the vacuum furnace for embedding the heating element and mounting the insulation bushing and connector sleeve.

Even more recently, the applicant's Canadian patent application Ser. No. 532,677 entitled "Injection Molding Nozzle and Method" which was filed Mar. 20, 1987 discloses an improved method of providing a nozzle which may have a protective outer steel sleeve. However, if minimum outside diameter of the nozzle is important, which is often the case, this steel sleeve is machined off.

SUMMARY OF THE INVENTION

Accordingly, it is an object of the present invention to at least partially overcome the disadvantages of the prior art by providing a simple and economical method of making improved integral injection molding nozzles having a protective coating.

To this end, in one of its aspects, the invention provides a method of making an integral injection molding heated nozzle comprising the steps of forming an elongated steel body having a forward end, a rear end and a melt bore extending therethrough, the melt bore extending centrally from the rear end to adjacent the front end, the body having a neck portion adjacent the rear end and a generally cylindrical outer surface extending from the neck portion to adjacent the front end, the cylindrical outer surface having a spiral channel extending therearound, winding an electrically insulated heating element in the channel with a remote end fixed adjacent the forward end of the body and a cold terminal at the opposite end extending radially from the channel adjacent the rear end of the body, forming a steel collar portion having a central opening therethrough to snugly receive the neck portion of the body therein, the collar portion also having an opening extending radially therethrough from the central opening to receive therethrough the end of the heating element having the cold terminal, locating the collar portion in position on the rear end of the body with the neck portion of the body extending through the central opening in the collar portion and the cold terminal projecting through the radial opening in the collar portion, locating a hollow steel sleeve portion in position over the projecting cold terminal to partially enclose the cold terminal, with one end of the sleeve portion abutting against the collar portion in alignment with the radial opening therethrough, applying a coating of sticky liquid and metallic powder to the surfaces of the assembled body, collar portion and sleeve portion, and, heating the assembly in a vacuum furnace for a period of time and to a temperature sufficient to melt the metallic powder and remove the liquid, thereby integrally brazing the body, collar portion and sleeve portion together and the heating element in the channel, and providing a protective metallic coating of substantially uniform thickness over the surfaces of the assembly.

In another of its aspects, the invention provides an integral injection molding heated nozzle including drilling a hole diagonally into the body to adjacent the forward end to removably receive a thermocouple therein to measure the operating temperature of the body adjacent the forward end.

Further objects and advantages of the invention will appear from the following description, taken together with the accompanying drawings.

BRIEF DESCRIPTION OF THE DRAWINGS

FIG. 6 is a schematic view illustrating the assembled nozzle being dipped in a lacquer bath;

FIG. 7 is a similar view showing it being dipped in nickel powder;

FIG. 8 shows a batch of assembled nozzle inserted into a vacuum furnace;

FIG. 9 is a sectional view showing the forward end of a nozzle according to the embodiment of the invention shown in the previous Figures;

DETAILED DESCRIPTION OF THE DRAWINGS

Figure 1:
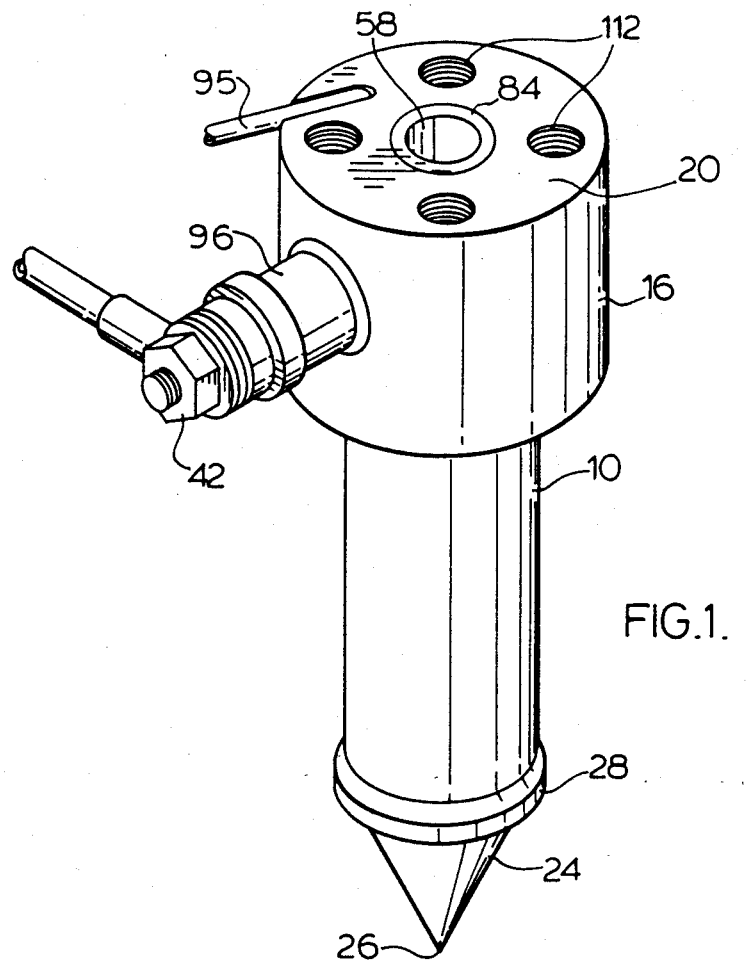
FIG. 1 is an isometric view of an injection molding nozzle made according to one embodiment of the invention.
Figure 2:
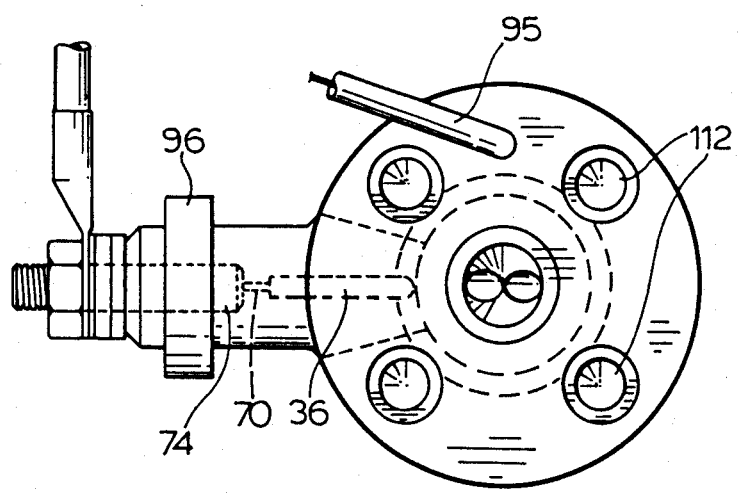
FIG. 2 is a top view of the nozzle seen in FIG. 1.
Figure 3:
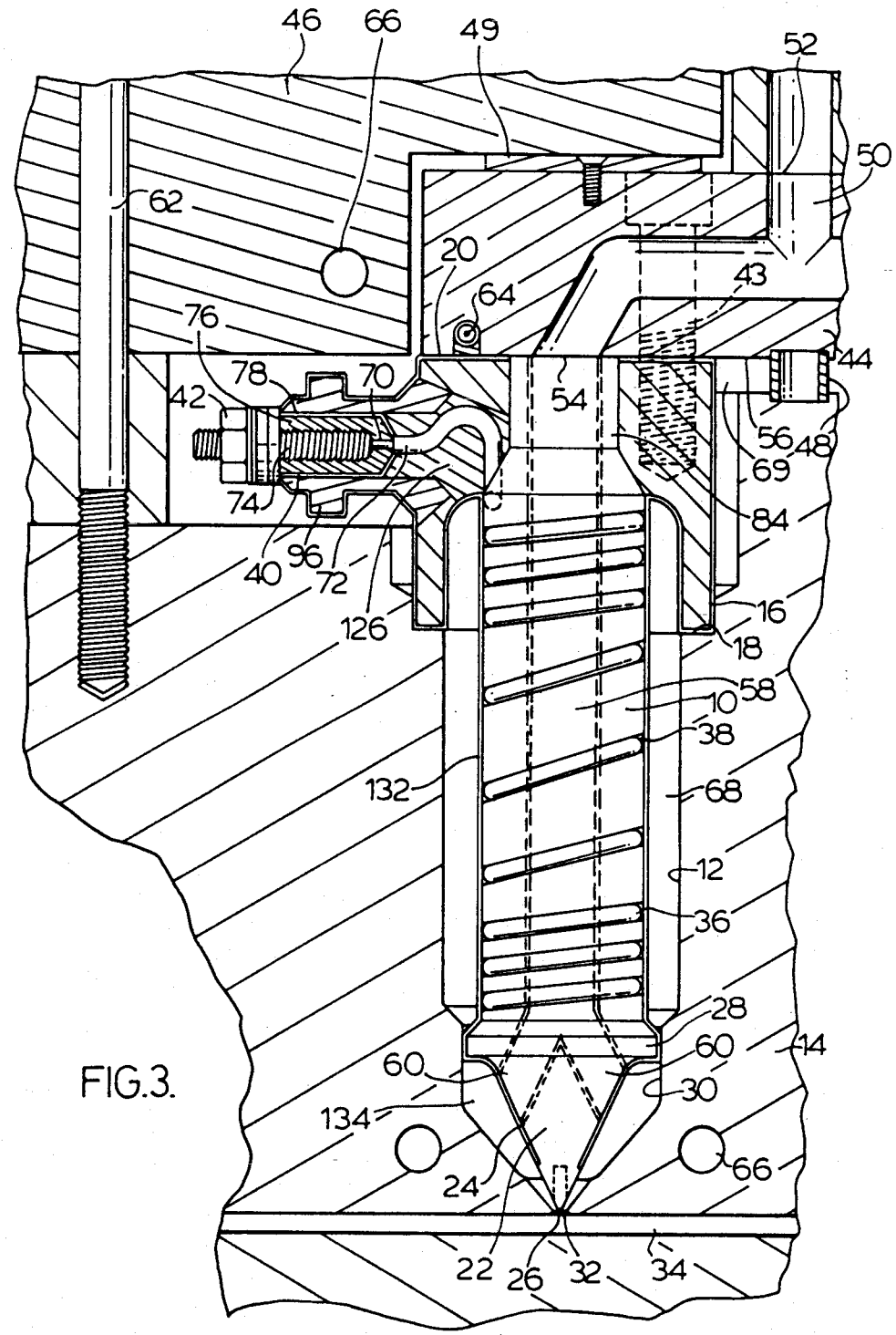
FIG. 3 is a partial sectional view showing a portion of an injection molding system including a nozzle as shown in FIG. 1.

Reference is first made to FIG. 3 which shows a nozzle 10 made according to one embodiment of the invention in place in a multi-cavity injection molding system. Each nozzle 10, as shown in FIGS. 1 and 2 is located in a well 12 in a cavity plate 14 by an insulation flange or bushing 16 which seats on a shoulder 18. The nozzle has a rear end 20 and a forward end 22 with a conical surface 24 and a tip 26. A circumferential flange 28 projects outwardly adjacent the conical shaped forward end 22 of the nozzle to contact the inner wall 30 of the well 12 to seal against the leakage of melt between them and to accurately locate the tip 26 in alignment with a gate 32 extending through the cavity plate 14 to the cavity 34. An electrically insulated heating element 36 is wound in a spiral channel 38 and has a cold terminal 40 to which an external electrical lead is attached by a nut 42.

Each nozzle 10 is fixed by bolts 43 to a common manifold 44 which is located between the cavity plate 14 and a back plate 46 by a locating ring 48 and a titanium pressure pad 49. The manifold 44 has a melt passage 50 which branches from a central inlet 52 to a number of outlets 54 on the other side 56. Each outlet is in alignment with a melt bore 58 which extends centrally from the rear end 20 of the nozzle 10 to a pair of melt bores 60 which extend diagonally to the conical surface 24. The back plate 46 is secured in place by bolts 62 which extend through into the cavity plate 14.

As is well known in the art, the manifold 44 is heated by an electric heating element 64 cast into it, and the nozzle is heated by the heating element 36 wound in the spiral channel 38. Conversely, the cavity plate 14 and the back plate 46 are cooled by cooling water flowing through cooling conduits 66. Thus, an insulative air space 68 is provided between the heated nozzle and the cooled cavity plate 14 and it is bridged by the thin insulation flange 16 which locates the nozzle without excessive heat loss. Similarly, the locating ring 48 provides another insulative air space 69 between the hot manifold 44 and the cooled cavity plate. The heating element 36 is of the single wire type with a chrome-nickel resistance wire 70 extending through a refactory powder electrical insulating material such as magnesium oxide inside a steel casing 72. The outer surface of the steel casing 72 is given a roughened finish to promote capilliary action during brazing. The heating element 36 has an enlarged cold terminal 40 with a larger conductor 74 which is welded to the wire 70 and has a ceramic insulator 76 inside a steel casing 78.

Reference will now be made to FIGS. 5 to 9 in describing the steps involved in making the nozzle according to one embodiment of the invention. An elongated body 80 is cast of a tool steel such as H13 with a generally cylindrical outer surface 82 extending between a smaller diameter neck portion 84 at the rear end 20 and a larger diameter circumferential sealing flange 28 adjacent the forward end 22. As can be seen, the forward end 22 has a conical outer surface 24 which extends to a smaller diameter cylindrical nose portion 86. A spiral channel 88 having a pitch according to a predetermined configuration is cut in the cylindrical outer surface 82 of the body. A hole 90 is drilled centrally in the nose portion 86, and a smaller diameter hole 92 is drilled extending beneath the sealing flange 28 connecting the hole 90 in the nose portion to the spiral channel 88.

A cylindrical collar portion 94 and a hollow sleeve portion 96 are also made of a suitable steel such as H13. The collar portion 94 has a central opening 98 extending therethrough to snugly receive the neck portion 84 of the body 80. As mentioned above, the collar portion 94 has a circumferential insulation flange 16 which is somewhat larger in diameter than the cylindrical outer surface 82 of the body 80. A tapered surface 100 leading to the central opening 98 matches a tapered surface 102 between the neck portion 84 and the cylindrical outer surface 82 of the body. As described below, these tapered surfaces 100,102 accurately locate the collar portion 94 on the body and they are given a roughened finish to promote capilliary action. The collar portion 94 also has a radial opening 104 extending outwardly therethrough from the central opening 98. The radial opening 104 has a tapered surface 106 which matches a tapered surface 108 on one end 110 of the hollow sleeve portion 96 to accurately locate the sleeve portion 96 when the end 110 is received in the radial opening 104. These tapered surfaces 106,108 are also given a roughened finish to promote capilliary action during brazing. The size of the radial opening 104 and the inside diameter of the sleeve portion 96 are sufficient to receive the enlarged cold terminal 40 of the heating element 36 therethrough. The collar portion also has bolt holes 112 to receive the bolts 43 which secure the nozzle 10 to the manifold 44.

The end 114 of the heating element 36 which is remote from the end 116 with the cold terminal 40 is inserted a predetermined distance into the diagonal hole 92 extending from the spiral channel 38 into the conical shaped forward end 22 of the body 80. Then, the remainder of the heating element 36 is tightly wound in the spiral channel 38 except for a portion at the opposite end 116 with the cold terminal 40 which projects radially adjacent the rear end 20 of the body 80. The body 80 with the heating element 36, the collar portion 94 and the sleeve portion 96 are then assembled. The outwardly projecting cold terminal 40 is inserted through the radial opening 104, and the collar portion 94 is tack welded in position on the rear end 20 of the body 80 with the neck portion 84 of the body snugly received in the central opening 98 through the collar portion 94. The sleeve portion 96 is then located over the projecting cold terminal 40 with the tapered end 110 tack welded in the radial opening 104 in the collar portion 94.

As shown in FIGS. 6 and 7, the assembly is immersed in a bath of acrylic lacquer 118 and then immersed in nickel alloy powder 120 which sticks to the lacquer to coat the surface of the assembled body 80, collar portion 94 and sleeve portion 96. The bolt holes 112 are covered with titanium oxide paint (not shown) and the projecting cold terminal 40 is also covered with a disposable plastic cover 121 so they are not coated, but otherwise the surfaces of the assembly are completely coated, including the melt bores 58 and 60 extending through the body 80. While the liquid 118 is preferably an acrylic lacquer which turns to carbon and burns off when heated in the vacuum furnace, other suitable sticky liquids may be used. The powder 120 is preferably nickel or an alloy thereof, but other suitable metals which form a protective coating may be used. In this embodiment, the powder 120 is agitated by aeration from the bottom (not shown) to provide a fluidized bath to ensure the assembly is completely coated. While the preferred method is to apply this coating by successively dipping the assembly in the liquid and then in the powder, it can be applied by spraying or brushing and this can be done in one step by mixing the powder in the liquid before application. After the coating has been applied, the assembly is oriented with the forward end 22 upright and a high speed steel insert portion 122 is inserted into the hole 90 drilled in the cylindrical nose portion. In the preferred embodiment, the insert portion 122 is hexagonal shaped to locate it in the hole 90, while still providing space around it. A predetermined quantity of nickel powder 124 or brazing paste is inserted into the hole 90 on top of the insert portion 122 to fill the space around it when the assembly is brazed. Another quantity of nickel powder or paste can be added if necessary inside the insulation flange 16 to ensure that after brazing the area 126 around the neck portion 84 leading to the sleeve portion 96 is filled to a desired level to embed the heating element 36 in nickel and securely fix the sleeve portion 96 to the collar portion 94.

The coated assemblies are then loaded in batches 128 into a vacuum furnace 130. In this embodiment, as the furnace is gradually heated to a temperature of approximately 2,200° F., the furnace is evacuated to a relatively high vacuum to remove substantially all the oxygen. When the coating is heated, the acrylic lacquer turns to carbon which is burned off and the nickel powder melts. The molten nickel flows by capilliary action around the roughened surface of the heating element 36 to completely fill the spiral channel 38 and integrally embeds the heating element 36 in the body 80. Similarly, the molten nickel flows between the abutting tapered surfaces 100,102 and 106,108 of the collar portion 94, body 80 and sleeve portion 96 and these surfaces are also roughened to promote capilliary flow of the nickel. The nickel powder inserted into the hole 90 in the nose portion 86 runs into the space around the high speed steel insert 122 and also around the remote end 114 of the heating element in the diagonal hole 92 to embed them into the body. The nickel powder on the surfaces of the assembly provides a complete protective coating 132 of nickel having a substantially uniform thickness, including the surfaces of the melt bores 58 and 60. Brazing the assembly in a vacuum provides a metallurgical bonding of the nickel to the steel which improves the efficiency of the heat transfer from the heating element 36 a well as the adherence of the protective coating. Thus an integral structure is provided which efficiently transfers heat from the heating element and distributes it more uniformly along the melt bore. As can be seen, the pitch or profile of the heating element 36 varies along its length to provide more heat at the ends of the nozzle than in the middle where there is less heat loss. This profile can be precisely controlled for any particular application by varying the pattern of the spiral channel 38 which is cut in the outer surface 82 of the body 80.

Figure 4:
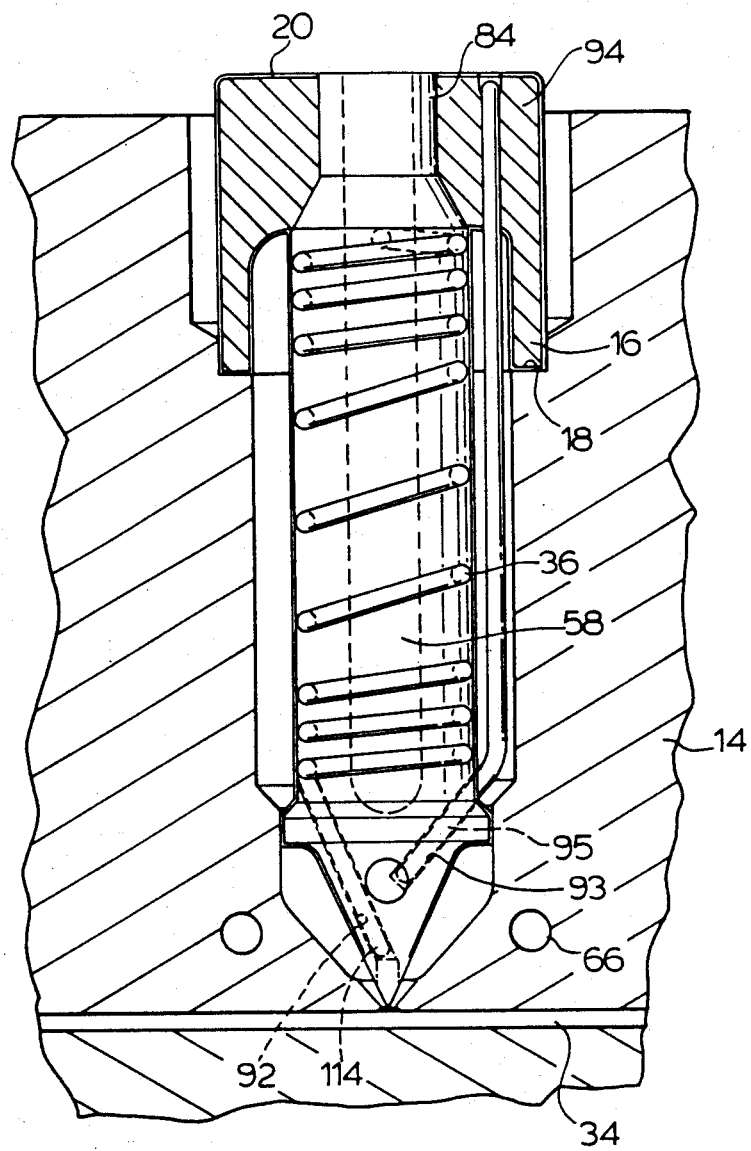
FIG. 4 is partial sectional view showing the nozzle, taken perpendicular to the view in FIG. 3.
Figure 5:
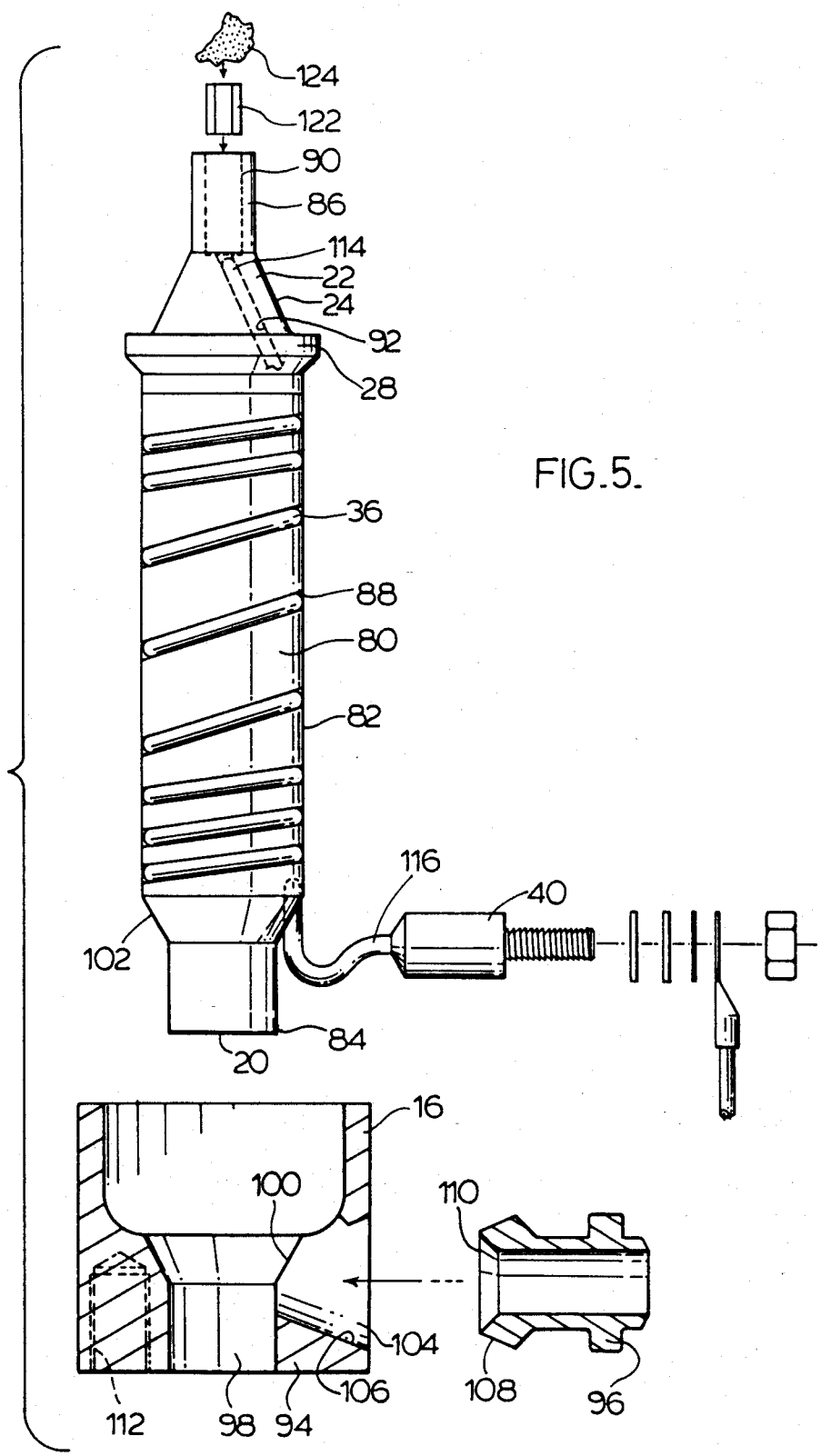
FIG. 5 is an exploded sectional view of the nozzle illustrating several steps in making it.

After the nozzles are cooled and removed from the vacuum furnace 130, the nose portion 86 with the integral high speed steel insert portion 122 is machined to provide the forward end 22 of the nozzle 10 with the conical surface 24 and a high speed steel tip 26 as shown in FIG. 9. As will be appreciated, making the tip 26 of high speed steel increases its resistance to wear from the melt flowing through the constricted area adjacent the gate 32, thus increasing the operating life of the nozzle. As can be seen in FIG. 4, another hole 93 is then machined to extend diagonally into the forward en 22 to removably receive a thermocouple 95 to measure the operating temperature of the body adjacent the forward end.

In use, after the injection molding system has been assembled as shown in FIG. 3, electrical power is applied to the heating elements 36 and 64 to heat the nozzles 10 and the manifold 44 to a predetermined operating temperature. Pressurized melt from a molding machine (not shown) is then introduced according to a predetermined cycle into the central inlet 52 of the melt passage 50 through the manifold 44. The melt then flows into the melt bore 58 and out of the connecting melt bores 60 in each nozzle, into the space 134 surrounding the conical shaped forward end 22, and then through the gate 32 into the cavity 34. The space 134 remains filled with melt which solidifies adjacent the cooled cavity plate 14 and the sealing flange 28 prevents it escaping into the insulative air space 68. After the cavities are full, injection pressure is held momentarily to pack and then released. After a short cooling period, the mold is opened to eject the product. After ejection, the mold is closed and the injection pressure is reapplied to refill the cavity. This cycle is continuously repeated with a frequency dependent on the size and shape of the cavity and the type of material being molded.

Figure 10:
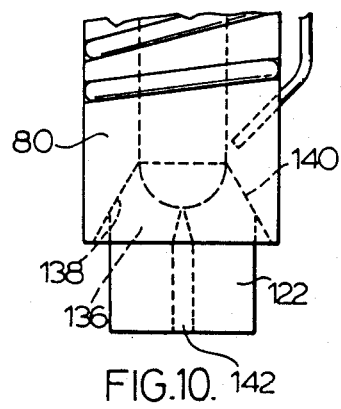
FIG. 10 illustrates a partially completed nozzle to have a forward end according to a second embodiment of the invention.
Figure 11:
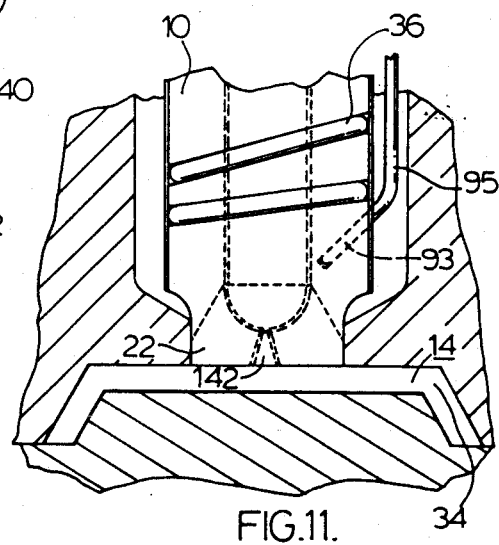
FIG. 11 shows the completed nozzle seen in FIG. 10 in position in a sprue gated system.

Reference is now made to FIGS. 10 and 11 which show a portion of a nozzle according to another embodiment of the invention in a sprue gated system. As most of the elements are similar to those of the embodiment described above, elements common to both embodiments are illustrated and described using the same reference numbers. In this embodiment, the body 80 of the nozzle 10 is made with a recess 136 having a tapered surface 138 to receive a generally cylindrical high speed steel insert portion 122 having a matching tapered surface 140 and a central bore 142. After the insert portion is integrally brazed in place in a vacuum furnace as described above, the nozzle is machined to have a high speed steel forward end 22 which abuts against the cavity 34. As can be seen, in this configuration the bore 142 through the high speed steel insert portion 122 forms the gate. A thermocouple receiving hole 93 is also machined to removably receive a thermocouple 95.

Figure 12:
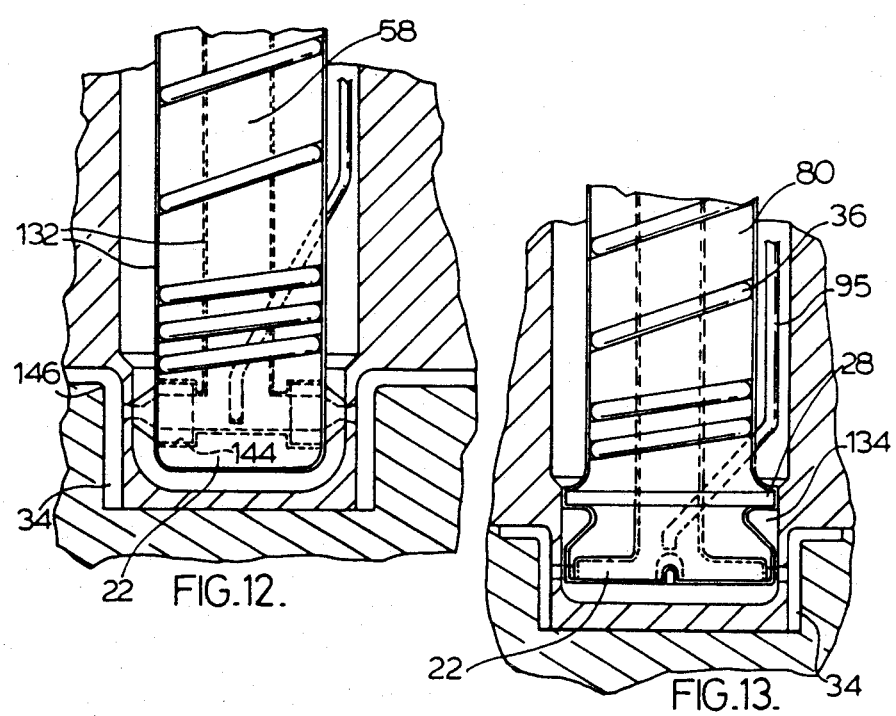
FIG. 12 shows a nozzle according to another embodiment of the invention having seals in an edge gated system.

FIG. 12 illustrates another embodiment in which the forward end 22 of the nozzle 10 is made with seats 144 to removably receive hollow seals 146 for edge gating. This type of edge seals are described in the applicant's U.S. Pat. No. 4,344,750 entitled "Edge Gated Injection Molding System with Hollow Seals" which issued Aug. 17, 1982. Of course, the outer surfaces and the melt bore 58 are given a nickel protective coating 132 as described above.

Figure 13:
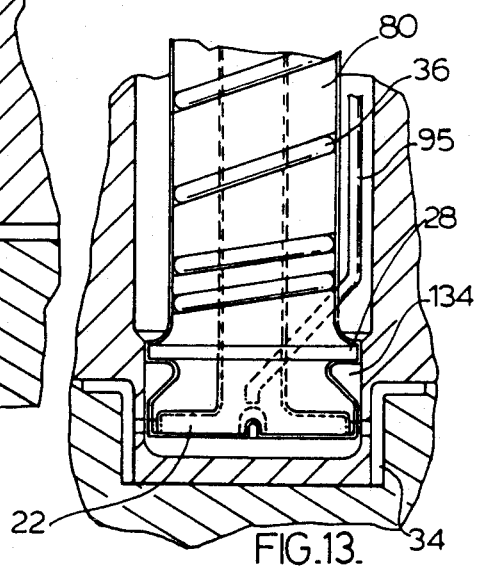
FIG. 13 illustrates a nozzle according to another embodiment of the invention in another edge gated system.

A further embodiment of the invention is illustrated in FIG. 13. In this case, the forward end 22 of the nozzle has a configuration for edge gating, but it has a circumferential sealing flange 28 to prevent the escape of melt from the space 134. These different embodiments merely illustrate that the forward end 22 of the nozzle can have a wide variety of configurations, depending upon the type of application required.

While the description of the nozzle and method of making it have been given with respect to preferred embodiments, it is not to be construed in a limiting sense. Variations and modifications will occur to those skilled in the art. Reference is made to the appended claims for a definition of the invention.

What I claim is:

1. An integral injection molding heating nozzle comprising:
   (a) an elongated steel body having a forward end, a rear end, and a melt bore extending therethrough, the melt bore extending centrally from the rear end to adjacent the front end, the body having a neck portion adjacent the rear end and a generally cylindrical outer surface extending from the neck to adjacent the forward end,
   (b) a steel collar portion integrally brazed to the body with the neck portion of the body extending through a central opening through the collar portion, the collar portion also having an opening therethrough extending radially from the central opening,
   (c) a hollow steel sleeve portion integrally brazed to the body with one end in alignment with the radial opening through the body,
   (d) an electrically insulated heating element integrally brazed in position wound in a spiral channel in the cylindrical outer surface of the body with one end extending from the channel through the radial opening in the collar portion into the sleeve portion and having a cold terminal which projects from the sleeve portion, and
   (e) a protective nickel coating of substantially uniform thickness which covers the surfaces of the body, collar portion and sleeve portion, as well as the heating element brazed in the spiral channel in the outer surface of the body.

2. A nozzle as claimed in claim 1 wherein the body has a hole extending diagonally into it to extend adjacent the forward end to removably receive a thermocouple therein to measure the operating temperature of the body adjacent the front end.

3. A nozzle as claimed in claim 1 wherein the collar portion has a circumferential insulation flange which is larger in diameter than the outer surface of the body, whereby when assembled the insulation flange extends towards the forward end of the nozzle around the outer surface of the body with an insulative air space therebetween.

4. A nozzle as claimed in claim 1 wherein the body has a high speed steel portion integrally brazed to it to provide a high speed steel forward end of a selected configuration.

5. A nozzle as claimed in claim 4 wherein the forward end of the body has a conical surface with a high speed steel tip, the steel body has an outwardly projecting circumferential sealing flange between the cylindrical outer surface and the conical surface of the forward end, and a plurality of melt bores extend diagonally from the conical surface to connect to the melt bore extending centrally from the rear end of the body.

6. A nozzle as claimed in claim 5 wherein the heating element has an end remote from the cold terminal end which is integrally brazed in a hole which extends diagonally beneath the sealing flange from the spiral channel into the conical shaped forward end of the body.

* * * * *